United States Patent [19]

Liker

[11] Patent Number: 4,523,201

[45] Date of Patent: Jun. 11, 1985

[54] METHOD FOR IMPROVING LOW-VELOCITY AIMING IN OPERATING AN INK JET APPARATUS

[75] Inventor: Stephen J. Liker, Danbury, Conn.

[73] Assignee: Exxon Research & Engineering Co., Florham Park, N.J.

[21] Appl. No.: 453,293

[22] Filed: Dec. 27, 1982

[51] Int. Cl.³ .............................................. G01D 15/16
[52] U.S. Cl. ................................. 346/1.1; 346/140 R
[58] Field of Search ...................... 346/1.1, 75, 140 R; 310/317

[56] References Cited

U.S. PATENT DOCUMENTS

| | | | |
|---|---|---|---|
| 3,979,756 | 9/1976 | Helinski et al. | 346/1 |
| 4,024,544 | 5/1977 | Vernon | 346/1 |
| 4,068,241 | 1/1978 | Yamada | 346/75 |
| 4,104,646 | 8/1978 | Fischbeck | 346/140 R |
| 4,112,433 | 9/1978 | Vernon | 346/1 |
| 4,184,168 | 1/1980 | Isayama et al. | 346/140 R |
| 4,266,232 | 5/1981 | Juliana, Jr. et al. | 346/140 R |
| 4,312,007 | 1/1982 | Winfield | 346/140 R |
| 4,393,384 | 7/1983 | Kyser | 346/1.1 |
| 4,424,521 | 1/1984 | Lewis et al. | 346/140 R |
| 4,471,363 | 9/1984 | Hanaona | 346/140 R |

Primary Examiner—E. A. Goldberg
Assistant Examiner—Gerald E. Preston
Attorney, Agent, or Firm—Kenneth Watov

[57] ABSTRACT

A method for improving droplet aim accuracy when operating an ink jet apparatus for ejecting ink droplets having velocities below 3.5 meters per second comprises the steps of first applying a primary electrical pulse to a transducer of the ink jet apparatus, for initiating the ejection of an ink droplet from an associated orifice via the production of a first pressure disturbance within the associated ink chamber of the ink jet; and thereafter prior to the break-off of the ink droplet from the orifice, applying an auxiliary pulse to the transducer, whereby the auxiliary pulse has a peak amplitude that is one-third that of the peak amplitude of the primary pulse, the latter causing a second pressure disturbance within the ink chamber of the ink jet, for causing the ink droplet to break off earlier and closer to the center of the orifice relative to the time and location of break-off in the absence of using the auxiliary pulse.

8 Claims, 11 Drawing Figures

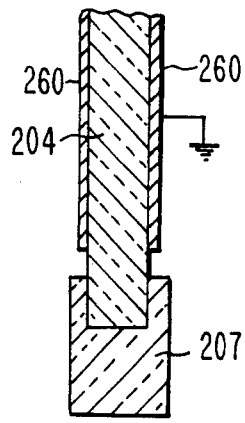
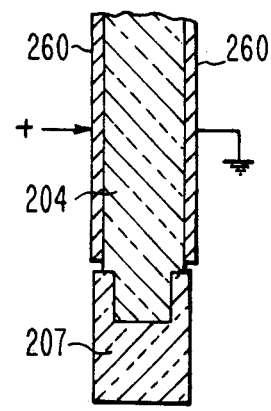
Fig. 4.    Fig. 5.
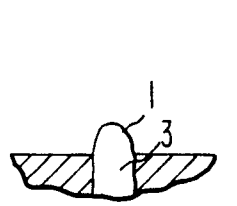 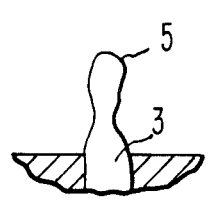 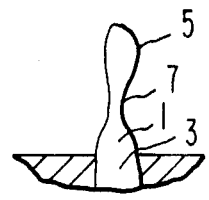 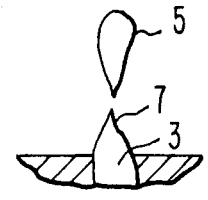
Fig. 6.    Fig. 7.    Fig. 8.    Fig. 9.
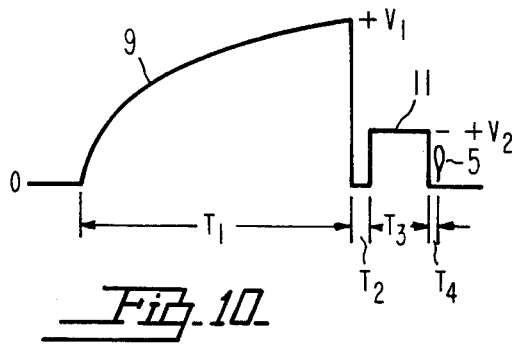
Fig. 10.
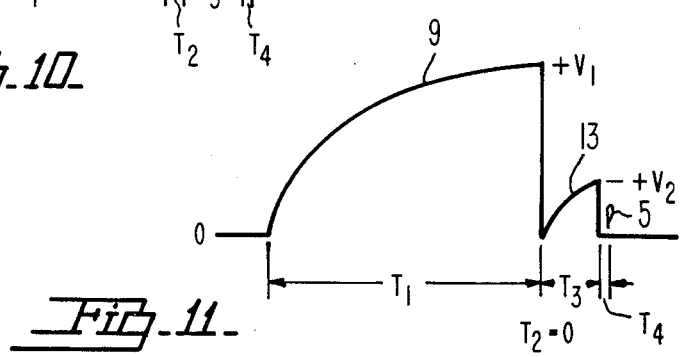
Fig. 11.

METHOD FOR IMPROVING LOW-VELOCITY AIMING IN OPERATING AN INK JET APPARATUS

The field of the present invention relates generally to ink jet apparatus, and more specifically to a method for operating an ink jet apparatus to substantially reduce aiming errors of the ejected ink droplets associated with low velocity operation of an ink jet apparatus.

The design of practical ink jet devices and apparatus for producing a single droplet of ink on demand is relatively new in the art. Investigation into the operation of drop-on-demand ink jet apparatus has uncovered a number of limitations. For example, when such an apparatus is operated for producing ink droplets having a relatively "low velocity", typically below 3.5 meters per second, aiming of the ink droplets has been a problem. Irregularities in the physical configuration of the orifice, such as pitmarks, scratches, or contamination by foreign particles, can all contribute either individually or in some combination to cause an ink droplet to be ejected away from the center of the orifice. If an ink droplet is ejected from the edge of an orifice, for example, with low velocity operation an error in "aim" usually results, whereby the droplet strikes the recording media (usually paper) away from the intended "hit area" or recording location. It has been observed that aim error tends to increase in direct relationship to the time that it takes for an ink droplet to break away from its ligament or the meniscus at the orifice, once the droplet has emerged from the orifice. The longer the ligament adheres to the droplet, the more likely that the droplet will be pulled away from the center of the orifice prior to its breaking away from the ligament and general region of the orifice, resulting in increased aim error.

The present invention provides a method for substantially improving aiming of ink droplets during low velocity operation of an ink jet apparatus. The method includes the steps of applying a first electrical pulse to a transducer of the ink jet apparatus for initiating but not completing the ejection of an ink droplet from the orifice of the ink jet device via the resultant creation of a first pressure disturbance within the ink chamber of the device; and thereafter applying to the transducer a second electrical pulse having a peak amplitude relative to that of the first electrical pulse, for producing a second pressure disturbance within the ink chamber and at the orifice, for causing the ink droplet to break off earlier and closer to the center of the orifice relative to the time and location of break-off in the absence of using the second electrical pulse. Note that the present invention is related to a similar method for improving the high velocity operation of an ink jet apparatus as shown in the co-pending application Ser. No. 453,571, filed Dec. 27, 1982, for: "Method for Operating an Ink Jet Apparatus" (the invention thereof is assigned to the assignee of my present invention), and is incorporated herein by reference. Also of interest is another copending application to the same assignee Ser. No. 384,131, filed June 1, 1982, for: Method of Operating an Ink Jet.

In the drawing, wherein like items have common reference designations:

FIG. 4 is a partial sectional/schematic diagram or view of the transducer shown in FIGS. 1 and 3, with the transducer in the de-energized state;

FIG. 5 is a partial sectional/schematic diagram or view of the transducer of FIG. 4 in the energized state;

FIGS. 6 through 9 show various stages of the development and ejection of an ink droplet from an orifice during ideal low-velocity operation of an ink jet apparatus;

FIG. 10 shows one form of waveshapes for the main and auxiliary transducer drive pulses of the present invention; and FIG. 11 shows waveshapes for another embodiment of the invention for the main and auxiliary transducer drive pulses.

In FIGS. 1 through 5, an ink jet apparatus of copending application Ser. No. 336,603, filed Jan. 4, 1982, for "Improved Ink Jet Method and Apparatus" is shown (the invention thereof is assigned to the assignee of the present invention), and incorporated herein by reference. The present invention was discovered during development of improved methods for operating the previously mentioned ink jet apparatus. However, the present inventor believes that the various embodiments of his invention illustrated and claimed herein are applicable for use with a broad range of ink jet apparatus (especially drop on demand ink jet apparatus). Accordingly, the ink jet apparatus to be discussed herein is presented for purposes of illustration of the method of the present invention, and is not meant to be limiting. Also, only the basic mechanical features and operation of this apparatus are discussed in the following paragraphs, and reference is made to the previously mentioned copending application for greater details concerning this apparatus. The reference designations used in FIGS. 1 through 5 are the same as used in the co-pending application, in order to facilitate any referencing back to that application or the patent that may issue therefrom.

Figure 1:
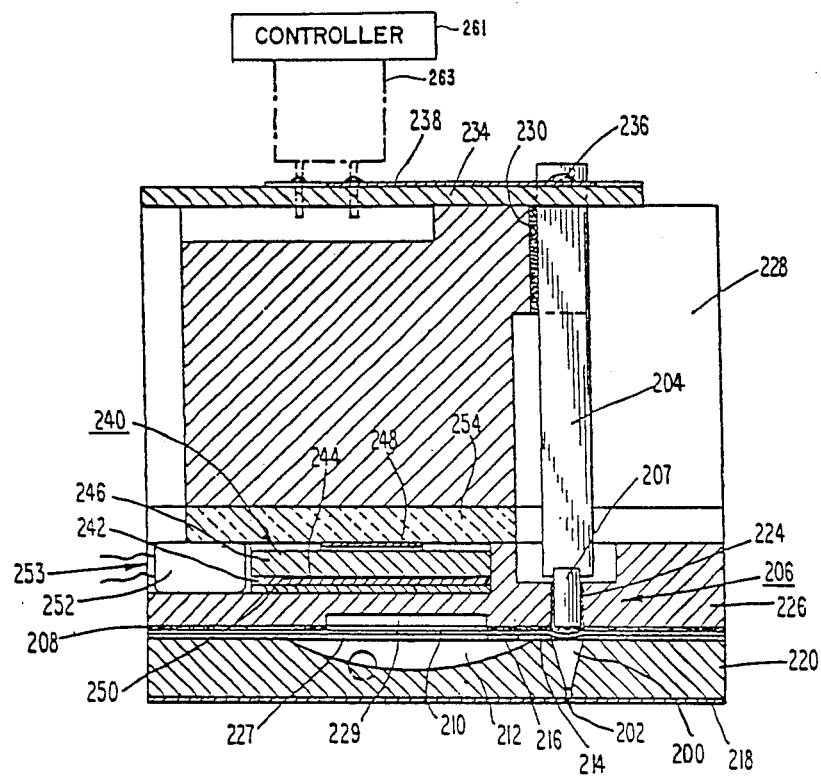
FIG. 1 is a sectional view of an ink jet apparatus.
Figure 2:
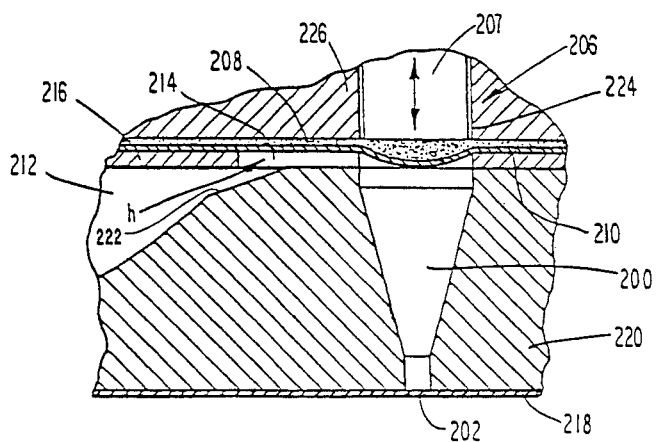
FIG. 2 is a large view of a portion of a section shown in FIG. 1.
Figure 3:
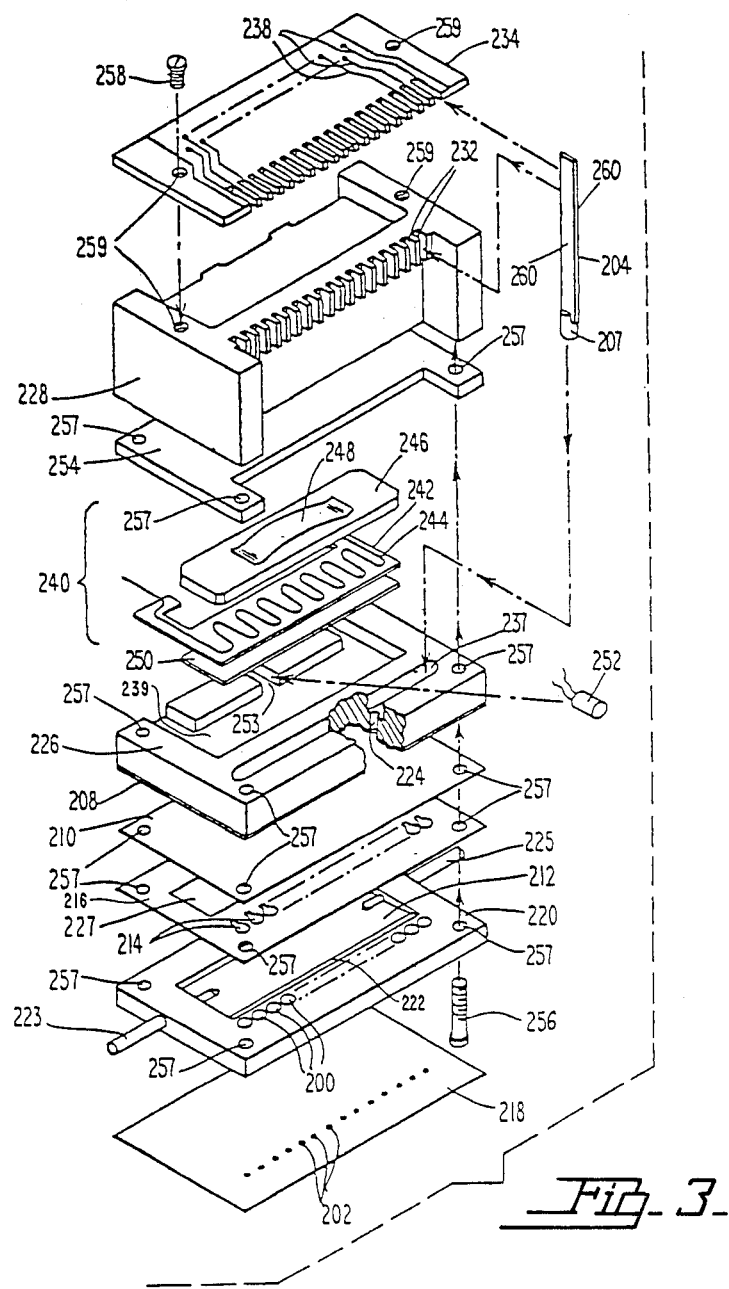
FIG. 3 is an exploded perspective or pictorial view of the ink jet apparatus including the embodiments shown in FIGS. 1 and 2.

With reference to FIGS. 1 through 3, the illustrative ink jet apparatus includes a chamber 200 having an orifice 202 for ejecting droplets of ink in response to the state of energization of a transducer 204 for each jet in an array of such jets (see FIG. 3). The transducer 204 expands and contracts (in directions indicated by the arrows in FIG. 2) along its axis of elongation, and the movement is coupled to the chamber 200 by coupling means 206 which includes a foot 207, a visco-elastic material 208 juxtaposed to the foot 207, and a diaphragm 210 which is preloaded to the position shown in FIGS. 1 and 2.

Ink flows into the chamber 200 from an unpressurized reservoir 212 through restricted inlet means provided by a restricted opening 214. The inlet 214 comprises an opening in a restrictor plate 216 (see FIG. 3). As shown in FIG. 2, the reservoir 212 which is formed in a chamber plate 220 includes a tapered edge 222 leading into the inlet 214. As shown in FIG. 3, the reservoir 212 is supplied with a feed tube 223 and a vent tube 225. The reservoir 212 is compliant by virtue of the diaphragm 210, which is in communication with the ink through a large opening 227 in the restrictor plate 216 which is juxtaposed to an area of relief 229 in the plate 226.

One extremity of each one of the transducers 204 is guided by the cooperation of a foot 207 with a hole 224 in a plate 226. As shown, the feet 207 are slideably retained within the holes 224. The other extremities of each one of the transducers 204 are compliantly mounted in a block 228 by means of a compliant or elastic material 230 such as silicon rubber. The compliant material 230 is located in slots 232 (see FIG. 3) so as to provide support for the other extremities of the transducers 204. Electrical contact with the transducers 204 is also made in a compliant manner by means of a compliant printed circuit 234, which is electrically coupled by suitable means such as solder 236 to an electrode 260 of the transducers 204. Conductive patterns 238 are provided on the printed circuit 234.

The plate 226 (see FIGS. 1 and 3) includes holes 224 at the base of a slot 237 which receive the feet 207 of the transducers 204, as previously mentioned. The plate 226 also includes a receptacle 239 for a heater sandwich 240, the latter including a heater element 242 with coils 244, a hold down plate 246, a spring 248 associated with the plate 246, and a support plate 250 located immediately beneath the heater 240. The slot 253 is for receiving a thermistor 252, the latter being used to provide monitoring of the temperature of the heater element 242. The entire heater 240 is maintained within the receptacle in the plate 226 by a cover plate 254.

As shown in FIG. 3, the variously described components of the ink jet apparatus are held together by means of screws 256 which extend upwardly through openings 257, and screws 258 which extend downwardly through openings 259, the latter to hold a printed circuit board 234 in place on the plate 228. The dashed lines in FIG. 1 depict connections 263 to the printed circuits 238 on the printed circuit board 234. The connections 263 connect a controller 261 to the ink jet apparatus, for controlling the operation of the latter.

The controller 261 is programmed to at an appropriate time, via its connection to the printed circuits 238, apply a voltage to a selected one or ones of the hot electrodes 260 of the transducers 204. The applied voltage causes an electric field to be produced transverse to the axis of elongation of the selected transducers 204, causing the transducers 204 to contract along their elongated axis. When a particular transducer 204 so contracts upon energization (see FIG. 5), the portion of the diaphram 210 located below the foot 207 of the transducer 204 moves in the direction of the contracting transducer 204, thereby effectively expanding the volume of the associated chamber 200. As the volume of the particular chamber 200 is so expanded, a negative pressure is initially created within the chamber, causing ink therein to tend to move away from the associated orifice 202, while simultaneously permitting ink from the resevoir 212 to flow through the associated restricted opening or inlet 214 into the chamber 200. Given sufficient time, the newly supplied ink completely fills the expanded chamber and orifice, providing a "fill before fire" cycle. Shortly thereafter, the controller 261 is programmed to remove the voltage or drive signal from the particular one or ones of the selected transducers 204, causing the transducer 204 or transducers 204 to return to their deenergized states as shown in FIG. 4. Specifically, the drive signals are terminated in a step like fashion, causing the transducers 204 to very rapidly expand along their elongated axis, whereby via the visco-elastic material 208 the feet 207 of the transducers 204 push against the area of the diaphram 210 beneath them, causing a rapid contraction or reduction of the volume of the associated chamber or chambers 200. In turn, this rapid reduction in the volume of the associated chambers 200, creates a pressure plate or positive pressure disturbance within the chambers 200, causing an ink droplet to be ejected from the associated orifices 202. Note that as shown in FIG. 5, when a given transducer 204 is so energized, it both contracts or reduces its length and increases its thickness. However, the increase in thickness is of no consequence to the illustrated ink jet apparatus, in that the changes in length of the transducer control the operation of the individual ink jets of the array. Also note, that with present technology, by energizing the transducers for contraction along their elongated axis, accelerated aging of the transducers 204 is avoided, and in extreme cases, depolarization is also avoided.

For the purposes of illustration, assume that low velocity operation of an ink jet apparatus is obtained when ink droplets are ejected having a velocity below about 3.5 meters per second. FIGS. 6 through 9 show various stages in the production of an ink droplet during low velocity operation of an ink jet apparatus under substantially ideal conditions. In FIG. 6, shortly after the application of the positive pressure pulse to the associated ink chamber, ink or the ink meniscus 1 begins to emerge from the orifice 3 of the ink jet. Shortly thereafter, a discernable ink droplet 5 begins to form, as shown in FIG. 7. Still later, the formation of the ink droplet 5 is almost complete, and it is attached via a ligament 7 to ink 1 protruding from the orifice 3. Finally, as shown in FIG. 9, the ink droplet 5 moves further away from the orifice 3 and breaks away from the ligament 7, completing the ejection of the ink droplet 5 from the orifice 3.

During ideal low velocity operation of an ink jet apparatus, the droplet 5 is ejected from substantially directly above the center of the orifice 3 as shown in FIG. 9. The present inventor discovered during operation of the ink jet apparatus illustrated herein that in practice when the transducers 204 of the ink jet array shown in FIG. 3 are driven only by a primary pulse 9 as shown in FIG. 10, that surface tension forces at the orifice 3 tend to pull the drops asymmetrically toward orifice irregularities at the edge of the orifice, causing the drop to break-off at a point away from the center of the orifice 3. In turn, such break-off of droplets away from the center of the orifice causes "aiming" errors. In experiments using a 32 channel ink jet apparatus substantially the same in construction as the apparatus illustrated in FIG. 3, the present inventor discovered that the drop "aim error", that is the deviation of the drops from a desired "hit point" or "target area" upon a recording media such as paper, ranged from about 0.0005" (or 0.5 mils) to 0.0027" (or 2.7 mils). The range of the drop diameters was found to vary from 1.5 mils to 1.8 mils.

The present inventor discovered that by applying a secondary pulse shortly after termination of the primary pulse 9, substantial improvement of the "aiming" of the ink droplets was obtained. In FIG. 10, the preferred waveshape for the primary pulse 9 has an exponentially rising leading edge, and a step-like trailing edge, as shown. In this example, a secondary pulse 11 having a rectangular waveshape was used. He discovered in this example that by adjusting the amplitude $+V_2$ of the secondary pulse 11 to be one-third the amplitude of $V_1$ of the primary pulse 9 (typically $+V_1$ was equal to $+50$ volts), the lowest aiming error was obtained. Also, the period $T_1$ of the primary pulse 9 is typically 70 microseconds; the time period $T_2$ between the termination of the primary pulse 9 and initiation of the secondary pulse 11 is typically 3 microseconds; the time period or pulse width $T_3$ of the secondary pulse 11 is typically 21 microseconds; with the break-off of the droplet 5 typically occurring within a time $T_4$ of about 3 microseconds after the termination of the secondary pulse 11. The drop aim error was found to range from 0.08 mils to 0.65 mils, proving that the use of the secondary pulse 11 substantially reduces the drop aim error.

Further experimentation by the present inventor led him to discover that the waveshapes of FIG. 11 produced the lowest drop aim error range. As shown in FIG. 11, the primary pulse 9 is substantially identical to the primary pulse 9 of FIG. 10, but the secondary pulse 13 now has an exponentially rising leading edge, and a step-like trailing edge. The lowest droplet aim errors were produced when the ratio of the amplitude $+V_1$ of the primary pulse 9 to the amplitude $+V_2$ of the secondary pulse 13 is held to 3:1, as in the previous example or embodiment of the invention. Typically, $+V_1$ ranged from 30 to 40 volts, and $+V_2$ ranged from 10 to 13 volts. Also, the pulse width $T_1$ of the primary pulse 9 ranged from 50 microseconds to 100 microseconds, with a 20 microsecond rise time and a 1 microsecond fall time. Best results were obtained when the secondary pulse 13 was initiated immediately after the termination of the primary pulse 9 ($T_2$ equal to 0). Typically, the pulse width $T_3$ of the secondary pulse 13 was held to 20 microseconds. Break off of the droplet 5 occurred a period of time $T_4$ of about 3 microseconds after the termination of the secondary pulse 13. When using this preferred embodiment of the invention, the present inventor discovered that the range for the drop aim error was 0.07 mils to 0.55 mils. This compares with the previously mentioned droplet aim error range of 0.5 mils to 2.7 mils, when using only the primary pulse 9. Also, in this preferred embodiment, the droplet 5 diameter ranged from 1.2 mils to 1.4 mils. Note that the waveshapes and relative amplitudes between the primary and secondary pulses for optimal performance are dependent upon the particular ink jet design. However, it is believed that the secondary pulse will always have a lower amplitude than the primary pulse, for preventing secondary droplet formation.

By observing the drop break-off phenomena when operating the illustrated ink jet apparatus with the method of the present invention, the present inventor determined the mechanism for the improvement he obtained. He discovered that by using a secondary pulse such as 11 or 13 of FIGS. 10 and 11, respectively, that the leading edges of these pulses initiated a short refill cycle for the associated ink chamber, causing ink to be pulled back from the orifice into the chamber during the time of occurrence of the secondary pulses 11, 13, and at their termination the ink is pushed back. In this manner oscillations are produced in the ligament 7 connecting the orifice 3 to the emerging droplet 5, causing the droplet to break-off at substantially the center of meniscus. This snap back phenomena, as previously mentioned, helps overcome surface tension forces which tend to pull the drop asymmetrically towards orifice irregularities. In this manner, the method of the present invention substantially reduces drop aim errors.

Note that while conducting the experiments leading to the present invention, the present inventor used an ink having a viscosity of about 12 to 15 cps (centipoise). The particular ink used had an oil base and was heated to a temperature of about 135° F. in the various chambers of the ink jet array. It is believed that the method of the present invention will improve aiming in the low velocity operation of ink jet apparatus regardless of the viscosity of the ink used.

The controller 261 can be provided via hardwired logic, or by a microprocessor programmed for providing the necessary control functions, or by some combination of the two, for example. Note that a Wavetek Model 175 waveshape generator, manufactured by Wavetek, San Diego, Calif., was used by the present inventor to obtain the waveshapes shown in FIGS. 10 and 11. In a practical system, a controller 261 would typically be designed for providing the necessary waveshapes and functions, as previously mentioned, for each particular application.

Although particular embodiments of the present inventive method for operating an ink jet apparatus have been shown and described, other embodiments which fall within the true spirit and scope of the appended claims may occur to those of ordinary skill in the art.

What is claimed is:

1. A method for driving an ink jet head with a composite waveform including independent successive first and second electrical pulses for ejecting an ink droplet to print with improved droplet aim accuracy at droplet velocities less than 3.5 meters per second, said method further comprising:
    constructing said second electrical pulse with a pulse width substantially shorter than the pulse width of said first electrical pulse; and
    further constructing said second electrical pulse to have an amplitude not greater than the amplitude of said first electrical pulse, whereby termination of said first electrical pulse causes rapid volume reduction of an associated ink chamber of said ink jet head, thereby initiating the ejection of an ink droplet from an associated orifice of said ink chamber, followed by initiation of said second electrical pulse for rapidly expanding the volume of said ink chamber, for causing said droplet to break-off earlier from the center of said associated orifice relative to the time and location of break-off in the absence of said second electrical pulse.

2. The method of claim 1, wherein step said second electrical pulse occurs substantially immediately after the termination of said first electrical pulse.

3. The method of claim 1, wherein step said second electrical pulse occurs shortly after the termination of said first electrical pulse.

4. The method of claims 1, 2, or 3, further including the step of shaping said first electrical pulse to have an exponential leading edge and step-like trailing edge.

5. The method of claim 4, further including the step of shaping said second electrical pulse to have an exponential leading edge and steplike trailing edge.

6. The method of claim 3, further including the steps of shaping said first pulse to have an exponential leading edge and step-like trailing edge, and shaping said second pulse to be rectangular.

7. The method of claim 1, further including shaping said second pulse to be rectangular.

8. The method of claim 1, further including shaping said second pulse to have an exponential leading edge and step-like trailing edge.

* * * * *